Figure 2:
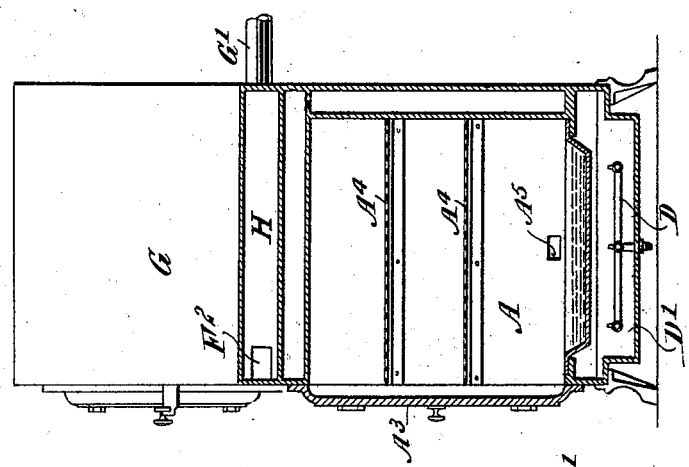

No. 692,516. Patented Feb. 4, 1902.
H. HIGGINS.
APPARATUS FOR COOKING, DESICCATING, OR SEASONING PURPOSES.
(Application filed Oct. 8, 1900.)
(No Model.) 3 Sheets—Sheet 1.

Witnesses:
Thomas Durant
J. Peyton, Jr.

Inventor:
Hubert Higgins
by Church & Church
his attys

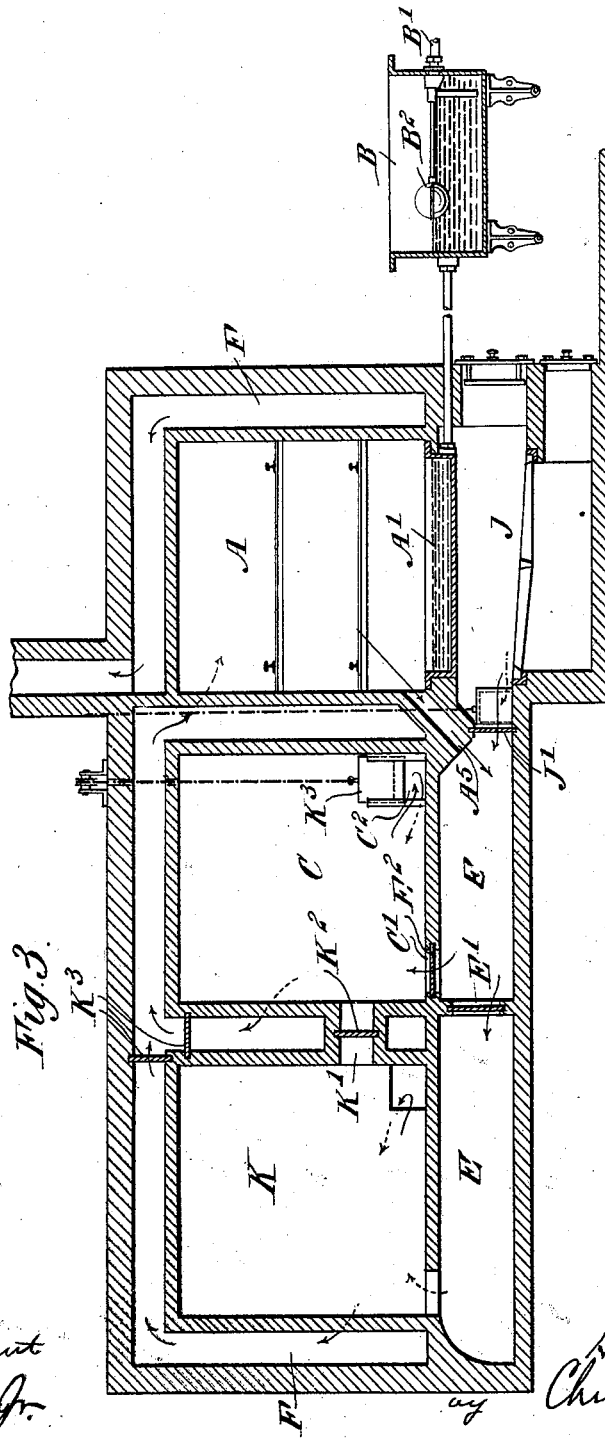

No. 692,516. Patented Feb. 4, 1902.
H. HIGGINS.
APPARATUS FOR COOKING, DESICCATING, OR SEASONING PURPOSES.
(Application filed Oct. 8, 1900.)
(No Model.) 3 Sheets—Sheet 3.
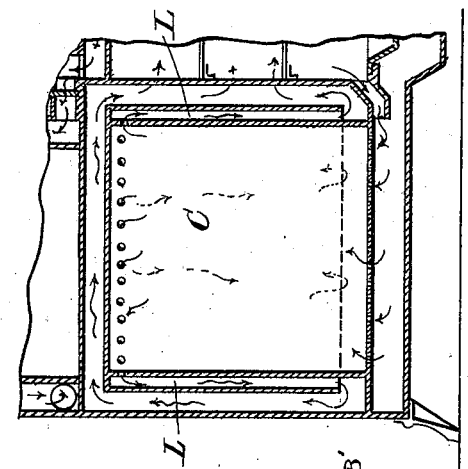
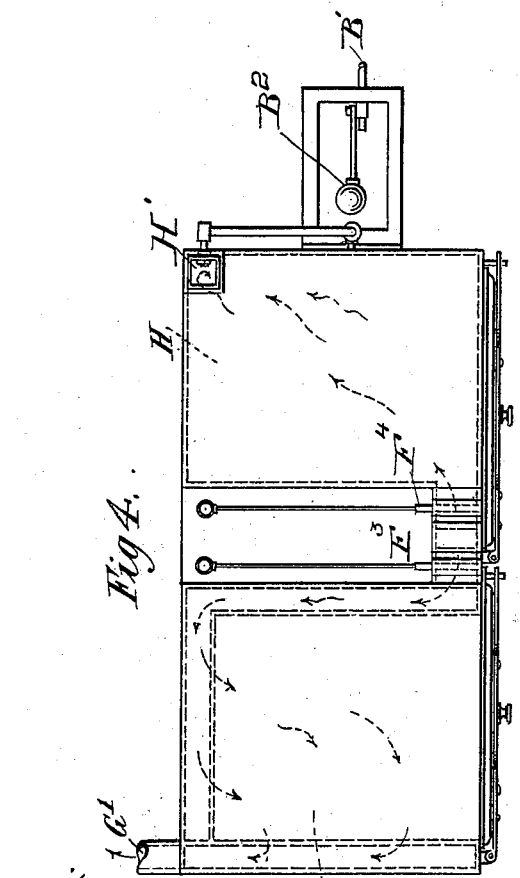
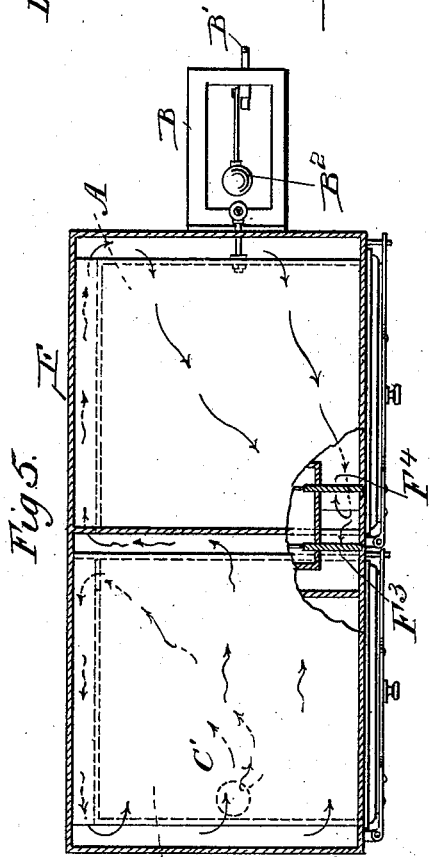

United States Patent Office.

HUBERT HIGGINS, OF CAMBRIDGE, ENGLAND.

APPARATUS FOR COOKING, DESICCATING, OR SEASONING PURPOSES.

SPECIFICATION forming part of Letters Patent No. 692,516, dated February 4, 1902.

Application filed October 8, 1900. Serial No. 32,393. (No model.)

*To all whom it may concern:*

Be it known that I, HUBERT HIGGINS, a subject of the Queen of England, residing at Cambridge, England, have invented certain new and useful Improvements in or Relating to Apparatus for Cooking, Desiccating, or Seasoning Purposes, (for which I have made application in Great Britain, Nos. 4,688 and 4,689, dated March 12, 1900,) of which the following is a specification.

This invention relates to improvements in apparatus for the treatment of inorganic materials with steam and with a mixture of steam and combustion-gases, said apparatus being intended more particularly for either the cooking of foodstuffs or for the desiccating and seasoning of wood.

In carrying out the invention I provide a partially-jacketed chamber, beneath which is placed the source of heat. The floor of the chamber is made of metal, so as to form a good conductor of heat, and in the bottom of the chamber is placed a shallow pan, or the floor of the chamber itself may constitute the pan. This pan is kept supplied with water at a constant level by any convenient means, preferably by connecting it with an external tank, which is kept supplied with water at a fixed level corresponding with the level desired within the pan. The pan thus acts as a boiler, the water therein evaporating and filling the chamber with steam, an escape for which is provided, preferably, in the lower portion of the chamber. The escaping steam is led by a pipe, so as to mix with the combustion-gases of the source of heat. An extra controllable outlet may be provided, so that part of the steam can be diverted into the jacket or direct into the flue. Adjoining and preferably to one side of the above chamber, which I call the "steamer," is a second chamber, which I call the "oven," having an opening or openings in the bottom, through which the mixture of steam from the steamer and combustion-gases from the source of heat pass into the oven. Arrangements are provided to diffuse the heat equally throughout the oven. A convenient construction is to provide the oven with a floor, across the under side of which the heating-gases flow, entering the oven at one side, while their escape-aperture is placed on the other side and preferably low down. Both chambers are partially or completely jacketed, and the heating-gases escaping from the oven are caused to circulate through the jacket before escaping into the atmosphere. Baffle-plates and the like may be arranged in the jacket to direct the flow of the gases. Instead of the gases entering the oven at one side, this chamber may be provided with a perforated floor, so that the gases enter equally over the whole surface of the floor. In this case the escape-holes for the gases may be arranged all around the top of the sides of the chamber, suitable baffle-plates being arranged in the jacket to direct their course downward and then upward before escaping into the atmosphere, or the escape-openings from the jacket may be placed low down.

It is evident that more than one oven may be combined with one steamer, in which case the heating-gases may be either led direct to each oven or may be caused to pass from one oven to the second before escaping into the jacket.

Doors, spy-holes, trays, and any necessary fittings are provided for both the steamer and ovens, and devices may be arranged to control the quantity and temperature both of the steam and of the combustion-gases when apart or mixed.

Figure 1:
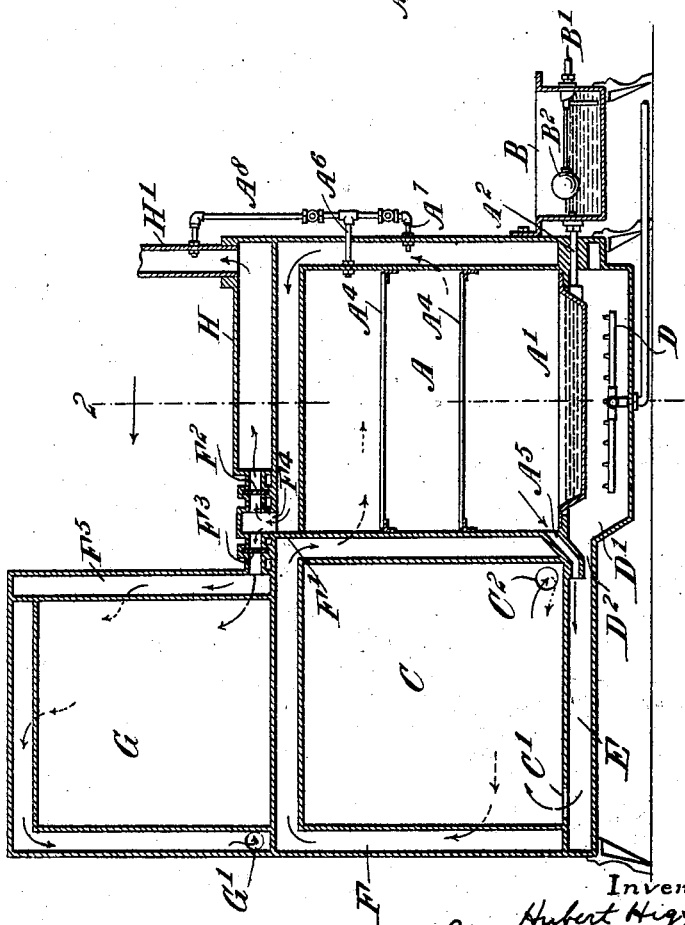

In the accompanying drawings, Figure 1 is a vertical transverse section of a convenient form of cooker constructed according to my invention. Fig. 2 is a section on the line 2 2 of Fig. 1. Fig. 3 is a vertical section of an apparatus, on a larger scale, adapted for treating wood in bulk for drying or seasoning purposes or for carrying out the first steps in an impregnating process. Fig. 4 is a plan view showing the circulation in the casing. Fig. 5 is a vertical section. Fig. 6 is a vertical section of the oven, showing a modified construction.

Referring first to Figs. 1 and 2, A is the steaming-chamber, the floor of which forms a shallow pan $A'$, connected by a pipe $A^2$ with a small cistern B. The cistern B is connected with a constant supply of water by a pipe $B'$, governed by a ball-cock $B^2$, so as to maintain a constant level of water in the cistern, and consequently in the pan $A'$. The chamber A is provided with a door $A^3$ and racks $A^4$ to receive the materials to be steamed. Beneath the steamer A is a gas-burner D, of any suitable construction, surrounded by a casing D', the upper part of which communicates by an opening $D^2$ with a flue E, which forms the floor of a second chamber or oven C. An opening C', extending, preferably, along the whole length of one side of the upper wall of this floor, forms a communication between the flue and the oven C. A pipe $A^5$ leads from the lower portion of the chamber A into the flue E adjacent to the opening $D^2$. The chambers A and C are placed in a casing F, which forms a jacket for the sides and tops of the chambers. An opening $C^2$ forms a communication between the oven C and this jacket, and baffle-plates F' are so placed as to direct the flow of the gases around all the sides of the two chambers before they reach the jacket outlet-pipe $F^4$. This pipe is provided with two branches controlled by dampers $F^3 F^2$, respectively, the one leading into the jacket $F^5$ of a drying-chamber G and the other opening into a space beneath a plate H, which forms a hot plate. Flues G' and H' from the jacket $F^5$ and hot plate H, respectively, serve for the final escape of the heating-gases. The oven C and drying or heating closet G are provided with doors and any usual fittings. A pipe $A^6$, leading from the chamber A, may be provided, communicating by valve-controlled pipes $A^7 A^8$ with the jacket F and exhaust-flue H', respectively.

The action of the apparatus is as follows: The gas-burner D, vaporizing the water in the pan A', fills the chamber A with a constant supply of steam, which acts on the materials—such as potatoes, puddings, &c.—placed within that chamber and escapes by the pipe $A^5$ into the flue E, where it mixes with the products of combustion from the burner entering by the opening $D^2$, which are thereby reduced to a temperature suitable for roasting—say from 450° Fahrenheit to 500° Fahrenheit. The mixture of steam and gases passes into the oven C by the opening C', circulates within said chamber, and passes on by the opening $C^2$ into the jacket F, finally escaping through either one or both of the flues G' H', according to the position of the dampers $F^2 F^3$.

The pipes $A^6 A^7$ and $A^6 A^8$ may be used to set up and accelerate the draft at starting or to lessen the amount of steam mixed with the combustion-gases.

Referring now to Fig. 3, the arrangement of the steaming-chamber A and the drying-chamber C is similar to that already described, but the gas-burner is replaced by a furnace J. A damper J' may be provided to control the amount of combustion-gases passing into the flue E, so as to regulate the temperature of the drying-chamber C. A second drying-chamber K may also be provided and adjustable dampers $E' E^2$ arranged, so that the heating-gases may be passed into either of the chambers C and K at will. The chamber K may also be connected with the chamber C by an opening K', controlled by a damper $K^2$, so as to pass the gases from the chamber C into the chamber K instead of directly from the flue E. Dampers $K^3$ may be placed in the jacket F to control the passage of the gases through the jacket. Each chamber is provided with doors and necessary fittings and preferably is furnished with rails, so that the wood may be run in on trucks. The effect of the steaming in the chamber A is to coagulate the coagulable products in the wood and that in chambers C and K to desiccate the wood.

As illustrated in Fig. 6, the oven C is provided with a perforated floor, and escape-holes M for the gases are arranged all around the top of the sides of the chamber, suitable baffle-plates L directing the course of said gases downward and then upward before escaping into the atmosphere.

What I claim as my invention, and desire to secure by Letters Patent, is—

1. In a heating apparatus and in combination a source of heat; a chamber placed above said source of heat; a shallow receptacle for water on the floor of said chamber; a second chamber; a jacket partly surrounding both chambers; an exhaust-opening in the jacket; a casing surrounding the source of heat so as to collect the combustion-gases; a flue underneath said second chamber communicating both with the casing and the second chamber; a conduit leading from the first chamber and opening into the said flue so as to carry the steam formed in said chamber into the flue and mix it with the combustion-gases coming from the casing; a communication between said second chamber and the jacket and means for circulating the gases passing from said chamber in the jacket before escaping by the exhaust-opening substantially as specified.

2. In a heating apparatus and in combination a source of heat; a chamber placed above said source of heat; a shallow receptacle for water on the floor of said chamber; means for maintaining a constant level of water in said receptacle; a second chamber; a jacket partly surrounding both chambers; an exhaust-opening in the jacket; a casing surrounding the source of heat so as to collect the combustion-gases; a flue underneath said second chamber communicating both with the casing and the second chamber; a conduit leading from the first chamber and opening into said flue so as to carry the steam formed in the said chamber into the flue and mix it with the combustion-gases coming from the casing; a communication between said second chamber and the jacket and means for circulating the gases passing from said chamber in the jacket before escaping by the exhaust-opening substantially as specified.

3. In a heating apparatus and in combination a source of heat; a chamber placed above said source of heat; a shallow receptacle for water in the floor of said chamber; a second chamber; a jacket partly surrounding both chambers; an exhaust-opening in the jacket; a casing surrounding the source of heat so as to collect the combustion-gases; a flue underneath said second chamber communicating both with the casing and the second chamber; means to control the communication between the casing and the flue; a conduit leading from the first chamber and opening into said flue so as to carry the steam formed in said chamber into the flue and mix it with the combustion-gases coming from the casing; a communication between said second chamber and the jacket and means for circulating the gases passing from said chamber in the jacket before escaping by the exhaust-opening substantially as specified.

4. In a heating apparatus and in combination a source of heat; a steaming-chamber placed above said source of heat; a shallow receptacle for water on the floor of said chamber; two drying-chambers; a jacket partly surrounding all the chambers; a casing surrounding the source of heat so as to collect the combustion-gases; a flue underneath the two drying-chambers communicating with the casing and with both drying-chambers; means for controlling the communication between the casing and the flue, and means for controlling the communications between the flue and the drying-chambers; a conduit leading from the steaming-chamber and opening into said flue; a communication between the two drying-chambers and means for controlling the said communication; a communication between each of said drying-chambers and the jacket and means for controlling said communications; and adjustable means for controlling the circulation of the heating-gases in the jacket substantiallly as specified.

In testimony whereof I have signed my name to this specification in the presence of two subscribing witnesses.

HUBERT HIGGINS.

Witnesses:
HAROLD WADE,
HARRY B. BRIDGE.